US006044464A

United States Patent [19]

Shamir

[11] Patent Number: 6,044,464

[45] Date of Patent: Mar. 28, 2000

[54] METHOD OF PROTECTING BROADCAST DATA BY FINGERPRINTING A COMMON DECRYPTION FUNCTION

[75] Inventor: Adi Shamir, Rehovot, Israel

[73] Assignee: Yeda Research and Development Co. Ltd. at the Weizmann Institute of Science, Rehovot, Israel

[21] Appl. No.: 09/074,415

[22] Filed: May 8, 1998

[51] Int. Cl.[7] .......... H04L 9/00

[52] U.S. Cl. .......... 713/186; 713/170; 380/255

[58] Field of Search .......... 380/255, 258; 713/170, 182, 186, 201, 159, 161, 172, 185

[56] References Cited

U.S. PATENT DOCUMENTS

| | | | |
|---|---|---|---|
| 4,993,068 | 2/1991 | Piosenka et al. | 380/23 |
| 5,067,162 | 11/1991 | Driscoll, Jr. et al. | 382/126 |
| 5,590,200 | 12/1996 | Nachman et al. . | |
| 5,613,012 | 3/1997 | Hoffman et al. | 382/115 |
| 5,805,719 | 9/1998 | Pare, Jr. et al. | 382/115 |
| 5,838,812 | 11/1998 | Pare, Jr. et al. | 382/115 |
| 5,870,723 | 2/1999 | Pare, Jr. et al. | 705/39 |
| 5,901,246 | 5/1999 | Hoffberg et al. | 382/209 |

*Primary Examiner*—Thomas R. Peeso
*Attorney, Agent, or Firm*—Evenson, McKeown, Edwards & Lenahan, P.L.L.C.

[57] ABSTRACT

A well-known technique to discourage piracy of digital objects is to fingerprint the version each customer receives. The invention provides a novel way of fingerprinting the decryption functions given by broadcasters to their customers (usually in the form of smart cards). The main difficulty is to ensure that all the algorithms provided by the broadcaster implement the same decryption function, and yet to make it computationally difficult for a pirate who obtains a large number of such implementations to find even one fundamentally different implementation which is not traceable to a particular customer.

21 Claims, 1 Drawing Sheet

10 — CHOSE RANDOM S AND $x=(x_1,\ldots.x_n)$ $y=(y_1,\ldots.y_n)$

12 — CHOSE UNIQUE k

14 — COMPUTE $T=(t_i,\ldots.t_n)$ WHERE $t_i=h(k,x_i)x$ OR $y_i$

16 — TRANSMIT s, k AND T

18 — RECEIVE AND STORE s, k AND T IN MEMORY

METHOD OF PROTECTING BROADCAST DATA BY FINGERPRINTING A COMMON DECRYPTION FUNCTION

BACKGROUND AND SUMMARY OF THE INVENTION

The present invention relates to a novel method of protecting broadcast data, especially encrypted audiovisual broadcast programs. More particularly, the present invention relates to a novel method of protecting broadcast programs by utilizing a novel technique of fingerprinting a common decryption function in broadcast systems.

Movies, music and software are often distributed in digital form to paying customers.

Since digital data can be easily stored and redistributed without any loss of quality, there is a real danger that some of these customers will give away or sell the data to other recipients, and thus hurt the revenue stream of the copyright holder.

A well known technique to discourage such piracy is to modify the data sent to each paying customer in a way which does not affect its intended purpose (i.e., it is not visible in images, it is not audible in music, and it does not affect the behavior of software). The copies 15 sent to the various customers are functionally identical, but each copy contains a unique hidden fingerprint, which can be extracted only by the sender who knows some secret key.

These fingerprints can be used to automate the process of scanning large databases (such as the internet) for stolen electronic property, to identify the misbehaving customer, and to prove his involvement in court.

To be useful, fingerprints should be hard to modify or to eliminate. Since they are likely to be generated by commercially available systems, we have to assume that the pirate knows the general nature of the fingerprinting scheme, but not the secret keys used by the sender to generate particular fingerprints. For example, an image can be marked by embedding the identity of the broadcaster and the customer in the least significant bits of the numbers representing the luminance of particular pixels. Such a subtle modification does not degrade the aesthetic value of the image and is not likely to be detectable by visual inspection, but it can be easily extracted from the image file by a program that knows where to look and what to look for.

Unfortunately, pirates can often defeat fingerprinting schemes by applying additional modifications. For example, the pirate can randomize the low order bits of all the pixels in the image, and thus eliminate the fingerprint even if he does not know where it was embedded. Another common technique is to crop, reduce, rotate, compress or rescan the image in order to change the actual location and value of various pixels in the image file. An even more powerful attack is to obtain several copies of the same image (with different fingerprints), and then to analyze and eliminate all the differences between them. A small group of colluding pirates (each posing as a legitimate customer) can often compute a new mixed image file which cannot be traced to any one of them.

The definition of the problem that this invention deals with is a special case of the general fingerprinting problem, in which the object to be fingerprinted is an algorithm for computing some function. It is motivated by the common practice of protecting audiovisual programs broadcast via cable or satellite by encrypting them and giving each paying customer the corresponding decryption algorithm. Typical pay-TV systems have millions of customers, and thus, it is impractical to send each customer a different encrypted version of the program. Instead, the sender broadcasts one encrypted version of the program, and all the customers use the same decryption function to gain access to the program.

The main security problem in such a scheme is that anyone who knows the common decryption algorithm can sell it to other customers, and thus, enable them to watch the programs without paying the broadcaster. This is particularly problematic when the common decryption algorithm is provided in the form of a software program which is executed in a set top box or in a personal computer. To make this more difficult, broadcasters usually provide the decryption algoritm embedded in a high security microprocessor, such as, a smart card. However, the financial rewards of piracy are so high that commercial pirates spend a lot of time and money on reverse engineering their smart cards. Eventually, they manage to extract the decryption algorithm, and sell it to other customers in the form of pirate cards, emulators, or computer programs.

The principal object of the present invention is, in effect, to watermark or fingerprint the decryption algorithms given to the various customers, in order to track (and then sue) the customer whose smart card was duplicated. As stated before, all the decryption algorithms should implement the same decryption function, but each one of them should be traceable to a particular customer.

A naive implementation of this idea is to use simple algorithmic modifications which have no effect on the result of the computation. For example, one can add dummy variables, exchange the order of unrelated computations, or add pairs of inverse operations, and thus generate millions of algorithms which are functionally equivalent but syntactically different. However, a clever pirate can extract the algorithm from his smart card, study it carefully, and then rewrite it in a totally different way in order to make the pirated copies untraceable. Again, this can be made much easier if the pirate extracts several algorithms from several smart cards, studies their differences, and creates a hybrid version by cutting and pasting modified pieces from the various versions.

To prevent such attacks, an object of the invention is to make the process of modifying one algorithmic representation of the function into another fundamentally different algorithmic representation difficult in some demonstrable way. The pirate can completely rewrite the program he extracts from his smart card, but careful examination of his modified program should reveal some unique feature of the variant he was trying to simulate. This difficulty should only apply to the pirate, whereas the broadcaster (who knows some additional secret information) should not have any difficulty in generating a large number of computationally isolated variants.

One particular scheme of this type was described in a recent paper by Naccache, Shamir and Stem (citation). It deals with the particular class of RSA decryption functions $f(x)=x^d \pmod n$, where d is the secret decryption exponent and n is the product of two secret primes p and q. The main observation is that d can be replaced by any exponent $d_i$ of the form $d_i=d+i*(p-1)*(q-1)$, without affecting the functional behaviour of the function f(x). On the other hand, the ability to find any pair of exponents $(d_i, d_j)$ with this property is equivalent to the factorization of n, which is believed to be a very difficult computational task. Thus, each customer can be given a different exponent $d_i$ from this sequence, and the pirate would not be able to replace one $d_i$ he extracts from his card by any equivalent exponent $d_j$ unless he can factor n. The pirate can try to hide the value of $d_i$ by performing the modular exponentiation operation in a convoluted way, but a sufficiently careful examination of the exponentiation code would reveal which exponent was used in the emulation.

However, in its simplest form this idea has serious practical drawbacks:

(a) The modular exponentiation function is too slow when implemented in software on standard smart cards.

(b) The modulus n can be factored if two different exponents are extracted from two smart cards by colluding pirates.

(c) The modulus can be factored in public key applications in which the pirate knows both the public encryption exponent e and the decryption exponent $d_i$ he extracted from his smart card.

The present invention overcomes these difficulties in the context of broadcast systems, in which the function is only applied to particular inputs which are chosen by the broadcaster and revealed to all the customers over a long period of time. The main characteristic of such schemes is that the pirate has to commit to his version of the decryption algorithm when he sells it to his customers, and cannot predict on which inputs his function will be evaluated (except for those which had already been publicly broadcast so far).

The new scheme does not depend on the special properties of particular functions, such as modular exponentiation. It can be based on any standard hash algorithm, such as SHA or MD5. In fact, the only property it uses is that it is difficult to predict the output of the function without actually applying it to its input. In particular, it is of no care or concern whether it is difficult to find collisions, and thus, one can use simplified versions of hash functions, pseudo random functions, or encryption functions in order to make them more suitable to smart cards.

The basic idea of the new scheme is to let each customer evaluate a completely different function, keyed by his unique key k. A simple way to achieve this is to let each customer apply a common hash function h to the concatenation of his unique key k and the given input x, but there are many additional ways to achieve this goal. However, we also have to guarantee that all the customers should get the same results when applying their unique functions to the common broadcast input. The broadcaster achieves this by choosing in advance the sequence $X=(x_1, \ldots, x_n)$ of the values he will actually broadcast, and giving each customer a unique precomputed modification table $T=(t_1, \ldots, t_n)$ (which typically contains the XOR's or differences between the computed and desired values). By using these values, each customer can derive the common value by a unique local computation, and use it to decrypt the broadcast audiovisual program.

Accordingly, the new method and scheme makes the fingerprinted algorithmic representations only partially equivalent; all the variants behave identically for inputs in some set X, and differently (with high probability) for inputs which are not in X. The broadcaster knows X, and uses only elements from X as inputs in the actual decryption process, in order to guarantee that all his customers perform the same decryption function. However, the pirate cannot find X even by analyzing a large number of variants extracted from multiple smart cards, and the unique behavior of the variant he sells on arbitrary inputs will expose his identity.

Other and further objects and advantages of the present invention will become more readily apparent from the following detailed description of preferred embodiments of the invention, when taken in conjunction with the drawings.

DESCRIPTION OF PREFERRED EMBODIMENTS

A preferred embodiment of the novel and inventive method of protecting broadcast data by fingerprinting a common decryption function will now be described. Numerous variants and extensions exist, which will be apparent and obvious to anyone skilled in the art.

Let h(.) be some hash function with good statistical properties, which maps large inputs to small outputs of size b. Let $T=(t_1, \ldots t_n)$ be a table of n b-bit values, and define a collection of functions $f_k(i,x)$ (in which k is a key, x is an input, and i is an index into the table T) as $f_k(i,x)=h(k,x)$ XOR $t_i$. The recommended sizes of k and x are at least 64 bits, and the recommended size b is between 1 and 64 bits.

Figure 1:
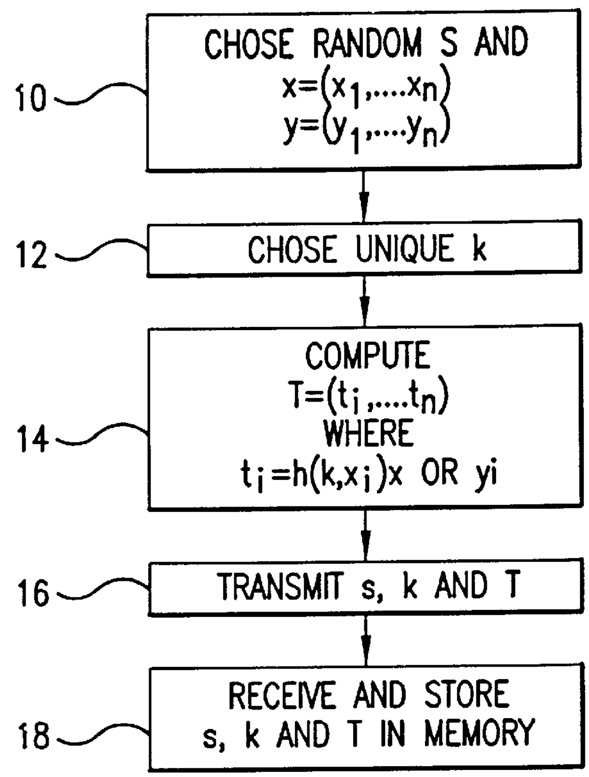
FIG. 1 shows in flow chart form how a broadcaster prepares for broadcast with respect to each particular customer.

The broadcaster chooses in advance, see block 10 in FIG. 1, a random sequence of inputs $X=(x_1, \ldots, x_n)$ and a random sequence of corresponding outputs $Y=(y_1, \ldots, y_n)$, which represent the common part of the mappings given to all the customers. Each customer receives from the broadcaster a smart card which contains the common hash function h, a common secret key s, a unique secret key k, and a unique table T which guarantees that for any i in the range [1, . . . , n], $f_k(i,x_i)=y_i$.

The broadcaster achieves this goal by precomputing for each customer the unique table T which consists of the values $t_i=h(k,x_i)$ XOR $y_i$, where k is the customer's unique key. The correctness of this construction follows from the fact that $f_k(i,x_i)=h(k,x_i)$ XOR $(h(k,x_i)$ XOR $y_i)=y_i$ for all the customers, regardless of their individual keys k. The foregoing is shown in the flow chart illustrated in FIG. 1 in blocks 10, 12, 14, 16 and 18.

Figure 2:
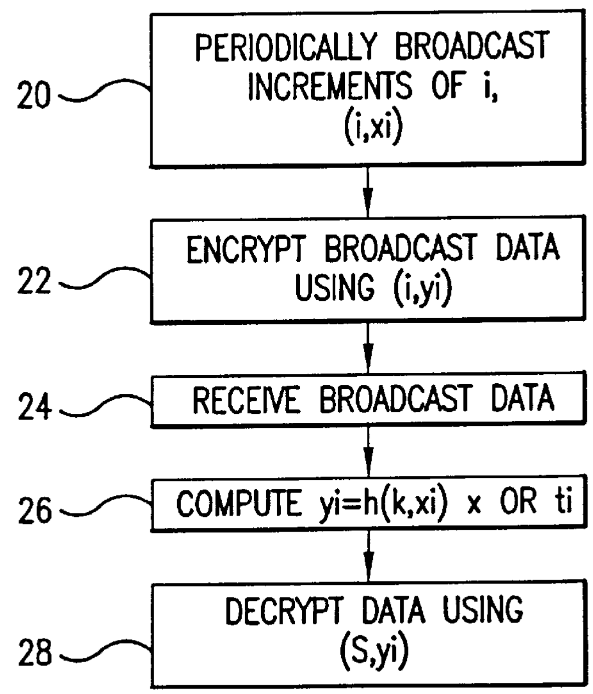
FIG. 2 shows in flow chart form how the broadcaster implements its broadcasts with respect to each customer over time.

The fingerprinting property follows from the fact that each $y_i$ is computed locally by each smart card in a very different way (i.e., by hashing the pair of inputs $(k,x_i)$ where k is specific to each smart card). For a good hash function h, it is impossible to predict the value of $y_i$ without actually applying h to $(k,x_i)$ where k is the key of some real smart card distributed by the broadcaster. The foregoing is illustrated in FIG. 2 in blocks 20, 22, 24, 26 and 28. Close inspection of the program in the pirate card will reveal the value of some k, and thus its source.

Today's smart cards have several kilobytes of memory. Each card can thus store a table T which contains thousands of single byte entries (when b=8) or tens of thousands of single bit entries (when b=1).

The broadcaster slowly reveals the successive pairs $(i,x_i)$ from his secret list X by broadcasting a new pair every once in a while, and asking all the customers to compute the common value of the new $y_i$ and to use it as part of the process of decrypting the data broadcast during that period. Note that the security of the fingerprinting scheme depends on the inability of the pirate to predict these $x_i$ values in advance, since if he knows all of them he can privately compute all the corresponding $y_i$ produced by his original card, and then sell pirate cards with a table of these $y_i$ values rather than with a program for computing them.

Similarly, if the broadcaster reveals a new $x_i$ very infrequently, the pirate could provide his customers with keyless cards, and send them the new value of $y_i$ whenever a new $x_i$ is revealed by the broadcaster. Either one of these approaches would make it impossible to associate the pirate card with a particular key k, and thus with a particular pirate. Consequently, the broadcaster should spread out the process of broadcasting new values over the expected lifetime of the card (which is typically 1–3 years), but do it sufficiently often. Simple calculation shows that when b=1, the broadcaster can release a new $x_i$ every few minutes, and when b=8, the broadcaster can release a new $x_i$ every few hours without running out of values.

The choice of b also depends on considerations of cryptographic strength. If b=64, we can use each $y_i$ directly as a decryption key to access the broadcast data, but cannot refresh its value very often (unless the card's memory is very large or its expected life is very short). To use smaller sizes, it is necessary to embed in each card an additional common secret key s, and use the concatenation of s and $y_i$ as the actual decryption key for the next period. In such a hybrid scheme, the stored s provides resistance to cryptanalysis, and the computed $y_i$ provides the fingerprinting capability.

A major advantage of the new scheme compared to previous proposals is that it is resistant to arbitrarily large coalitions of pirates. Consider the problem faced by pirates who extract from a large number of smart cards all their unique keys k and all their associated tables T. Their goal is to use their pooled knowledge in order to compute the sequence of $y_i$ values (before their associated $x_i$ are revealed by the broadcaster).

The correct $x_i$ values are characterized by the fact that all the extracted functions yield the same outputs for them. Mathematically, this is a strong characterization since it is extremely unlikely to be satisfied for a random x. However, due to the unpredictable behaviour of the hash function h and the huge number of possible x values, it is impossible to find these x in a reasonable amount of time. The pirate card they sell to their customers must thus contain at least one of the keys k they extracted from their original smart cards, and thus at least one of them will be exposed even if they try to cut and paste their individual programs in order to create an untraceable hybrid.

The invention is carried out using conventional computer equipment including such peripherals as are required. The actual machines to carry out the present invention will be known to those skilled in the art from the flow charts shown in the Figures of the drawing and described herein taken with the description of preferred embodiments including the algorithms disclosed and described. Also, the description is sufficiently clear and particularly points out to those skilled in the art the invention disclosed herein. The keys, hash function, the table and the algorithms are recorded in binary form on a magnetizable medium, optical medium or otherwise, and are machine and/or computer readable, or are included as software, firmware, or hardware.

Although the invention has been described with reference to preferred embodiments, nevertheless various changes and modifications which embody the inventive teachings herein will be evident to those skilled in the art. Accordingly, such changes and modifications which do not depart from the teachings of the present invention are deemed to come within the purview of the invention as expressed in the appended claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of fingerprinting a common function in broadcast systems comprising the steps of (a) determining for each customer a unique function, (b) arranging the functions to be identical on a subset X of inputs, and different (with high probability) on other inputs, and (c) broadcasting only inputs in X in order to enable all customers to compute common outputs, whereby to enable pirate cards to be traced to particular customers by analyzing their computations on arguments which are not necessarily in X.

2. The method of claim 1, including the further step of using the common outputs to decrypt encrypted data broadcast to all the customers.

3. The method of claim 1, including the further step of implementing the unique functions in software on a set top box or a personal computer.

4. The method of claim 1, including the further step of implementing the unique functions in a high security microprocessor.

5. The method of claim 1, including the further step of implementing the unique functions in a smart card.

6. The method of claim 1, including the further step of deriving the unique functions by applying a unique hash function to the input and XOR'ing it with entries from a precomputed unique table.

7. The method of claim 1, including the further steps of selecting the input as a pair of values $(i,x_i)$, and computing the output as $f_k(i,x)=h(k,x)$ XOR $t_i$ where k is a unique key, and $t_i$ is the i-th entry in a unique table T, which is precomputed by the broadcaster as $t_i=h(k,x_i)$ XOR $y_i$.

8. A method of fingerprinting a common function in broadcast systems comprising the steps of:

(a) establishing for each customer of a broadcaster a unique function and a unique modification table, (b) broadcasting to each customer a common input, (c) receiving, by each customer, the common input, (d) applying, by each customer, to the common input his unique function and modifying the result with entries from his unique modification table, (e) the results being identical on a subset X of inputs, and different (with high probability) on other inputs, so that (f) pirate functions are traceable to particular customers by analyzing the unique key and modification table used in their computations.

9. The method of claim 8, including the further step of the broadcaster periodically broadcasting new inputs from X, and using the common outputs as part of an encryption key.

10. The method of claim 8, including the further step of implementing the unique functions and tables in software on a set top box or a personal computer.

11. The method of claim 8, including the further step of implementing the unique functions and tables in a high security microprocessor.

12. The method of claim 8, including the further step of implementing the unique functions and tables in a smart card.

13. The method of claim 8, including the further step of applying a unique hash function to the input and then XOR'ing with an entry from the unique modification table.

14. The method of claim 8, in which the input is a pair of values $(i,x_i)$, and the output is computed as $f_k(i,x)=h(k,x)$ XOR $t_i$ where k is a unique key, and $t_i$ is the i-th entry in the unique modification table T, which is precomputed by the broadcaster as $t_i=h(k,x_i)$ XOR $y_i$, where $y_i$ is the common output value.

15. Apparatus for fingerprinting a common function in broadcast systems comprising:

(a) a first controller for establishing for each customer of a broadcaster a unique function and a unique modification table, (b) a broadcaster for broadcasting to each customer a common input, (c) a receiver for receiving, by each customer, the common input, (d) a second controller for applying, by each customer, to the common input his unique function and modifying the result with entries from his unique modification table, (c) the results being identical on a subset X of inputs, and different (with high probability) on other inputs, so that (e) pirate functions are traceable to particular customers by analyzing the unique key and modification table used in their computations.

16. The apparatus of claim 15, including a third controller for the broadcaster to periodically broadcast new inputs from X, and to use the common outputs as part of an encryption key.

17. Apparatus for protecting broadcast data by fingerprinting a common decryption function comprising (a) a controller for determining for each customer a unique function, with the functions arranged to be identical on a subset X of inputs, and different (with high probability) on other inputs, and (b) a broadcaster to broadcast only inputs in X in order to enable all customers to compute common outputs, whereby to enable pirate cards to be traced to particular customers by analyzing their computations on arguments which are not necessarily in X.

18. The apparatus of claim 17, including a further controller for use by an authorized customer receiving said broadcast to use the common outputs to decrypt encrypted broadcast data.

19. The apparatus of claim 18, wherein the further controller implements the unique functions in one of software on a set top box or a personal computer, a high security microprocessor and a smart card.

20. The apparatus of claim 17, wherein the controller derives the unique functions by applying a unique hash function to the input and XOR'ing it with entries from a precomputed unique table.

21. The apparatus of claim 17, wherein the controller selects the input as a pair of values $(i,x_i)$, and computes the output as $f_k(i,x)=h(k,x)$ XOR $t_i$ where k is a unique key, and $t_i$ is the i-th entry in a unique table T, which is precomputed as $t_i=h(k,x_i)$ XOR $y_i$.

* * * * *